United States Patent [19]

Iwahori et al.

[11] Patent Number: 4,824,563
[45] Date of Patent: Apr. 25, 1989

[54] EQUIPMENT FOR TREATING WASTE WATER

[75] Inventors: Keisuke Iwahori; Masao Fujiu, both of Tokyo, Japan

[73] Assignee: Kabushiki Kaisha Meidensha, Tokyo, Japan

[21] Appl. No.: 889,754

[22] Filed: Jul. 28, 1986

[30] Foreign Application Priority Data

Dec. 4, 1985 [JP] Japan .................. 60-272987
Dec. 4, 1985 [JP] Japan .................. 60-272988
Dec. 4, 1985 [JP] Japan .................. 60-272989
Dec. 4, 1985 [JP] Japan .................. 60-272990
Dec. 4, 1985 [JP] Japan .................. 60-272991

[51] Int. Cl.⁴ .............................................. C02F 3/30
[52] U.S. Cl. .................... 210/195.1; 210/196; 210/199; 210/202; 210/208; 210/218; 210/605
[58] Field of Search .............. 210/201, 202, 209, 218, 210/220, 221.1, 603, 605, 615-618, 624, 631, 760, 150, 151, 192, 195.1, 196, 205-208

[56] References Cited

U.S. PATENT DOCUMENTS 3,794,176 2/1974 Schnyder .................. 210/532.2
4,273,660 6/1981 Beitzel .................. 210/760
4,530,762 7/1985 Love .................. 210/603

FOREIGN PATENT DOCUMENTS 2147522 3/1973 France.
2464297 6/1981 France.
2552298 3/1985 France.
2034296 6/1980 United Kingdom.

OTHER PUBLICATIONS

Magara, Y. et al., Journal Water Pollution Control, vol. 52, No. 5, May 1980, pp. 914–922.

Primary Examiner—Tom Wyse
Attorney, Agent, or Firm—Bachman & LaPointe

[57] ABSTRACT

In the method of treating high-concentration organic waste water in dependence upon microorganism, waste water is first anaerobically treated in an anaerobic operation tank in dependence upon anaerobic bacteria groups and methane bacteria groups; in the second step, the waste water is further aerobically treated repeatedly in an aerobic operation tank, and an organic substance as hydrogen donor (raw waste water) is supplied to the aerobic operation tank before the succeeding aerobic treatment; in the third step, ozone treatment is effected to decolor the treated water. Two speed bacteria culture tanks for sludge bacteria and methane bacteria are provided separately to supply bacteria to the anaerobic operation tank for providing further reliable decomposition and denitrification of organic substance into methane and nitrogen gasses.

14 Claims, 8 Drawing Sheets

NITRIFICATION AND DENITRIFICATION REACTIONS BY BACTERIA

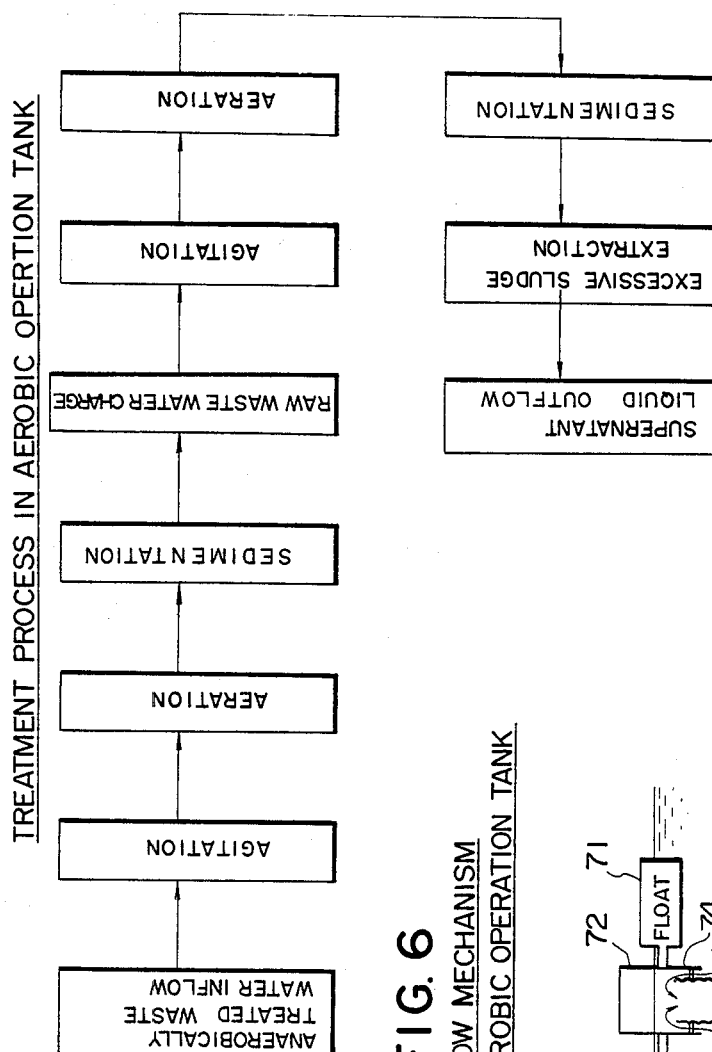
FIG. 5 TREATMENT PROCESS IN AEROBIC OPERATION TANK
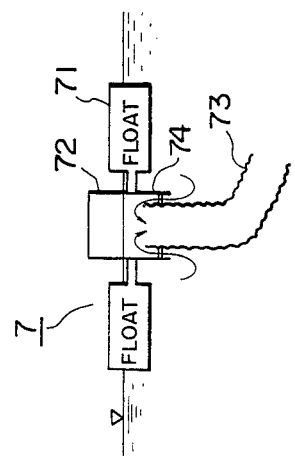
FIG. 6 OUTFLOW MECHANISM OF AEROBIC OPERATION TANK

CONNECTION BETWEEN AEROBIC OPERATION TANK AND OZONE TREATMENT TANK

EQUIPMENT FOR TREATING WASTE WATER

BACKGROUND OF THE INVENTION

1. Field of the Invention

The present invention relates to a method of treating waste water or sewage and equipment for realizing the method and more specifically to a waste water treatment method by which organic substances included in waste water can be decompoased in dependence upon microorganism, that is, biological treatment.

2. Description of the Prior Art

As the methods of treating high-concentration organic waste water represented by sewage discharged from home or excrementitious matter (feces and urine) discharged from a barn, conventionally there have been adopted a method of combining of a septic tank based upon mainly anaerobic treatment and an aerobic treatment tank disposed after the septic tank for realizing trickling filter method, activated sludge method or contact aeration method, etc.

In these methods, however, there exist the following problems. (1) Since a many-hour aeration is required, the power consumption is relatively great. (2) Dilution is required. (3) Maintenance and management are troublesome. (4) The treatment and disposal of the produced sludge are difficult.

In addition, although a great amount of nitrogen, in particular, is included in the excrementitious matter, it is impossible to sufficiently eliminate the nitrogen on the basis of the conventional methods. Further, since colored substance formed by bile coloring matter mainly consisting of stercobilin is included in the excrementitious matter, and therefore it is impossible to eliminate this colored substance in dependence upon the conventional methods, this colored substance is included in the treated waste water. When this substance is discarded into rivers, the rivers are colored, thus resulting in water pollution from the standpoint of the sense of sight.

On the other hand, recently, batch-type activated sludge methods have been highlighted mainly in the small-scaled sewage treatment or operation equipment. In this method, waste water is introduced into a liquid mixed with activated sludge put in a treatment tank, and aeration, solid-liquid separation and supernatant outflow are effected in series in this treatment tank. This method has various advantages such that: (1) bulking (malsedimentation) will not occur; (2) this method is of energy saving type; and (3) no high-degree operation technique is required. Further, as compared with the conventional continuous treatment operation, it has been reported that the denitrification effect and the dephosphorization effect are high because aeration and sedimentation are repeated.

In the batch type activated sludge method, however, the high effect of denitrification has only empirically been reported, and there exists no guarantee that the high denitrification effect can always be obtained whenever the equipment is actually operated. Further, with respect to the structure of the equipment, since an overflow method cannot be adopted to flow out the supernatant waste water as in the usual continuous operation, an appropriate mechanism has so far been required.

In the method of treating life sewage, livestock waste, etc., as is represented by activated sludge method, for instance, at present, biological treatment methods based upon the metabolic action of a microorganism group have mainly been adopted. To realize these methods, conventionally the treating method such as activated sludge method or biological membrane method, in which a mixed microorganism group is cultured collectively, has been adopted. However, recently, the system in which nitrification reaction is effected is separated from that in which denitrification reaction is effected. That is, in these methods, plural treatment tanks are provided for enhancing each peculiar reaction separately. This is because it is possible to realize a condition under which a reaction peculiar to an microorganism can readily be enhanced as much as possible, that is, the treatment system can be realized in natural fashion. In order to realize such a treatment system as described above, it is necessary to devise the structure of the treatment tank. However, it is difficult to obtain the treatment function answering the object in dependence upon only the tank structure.

Further, organic substances in waste water can be decomposed by aerobically treating the waste water by activated sludge for denitrification or dephosphorization, and thereafter the treated waste water is discharged into rivers after disinfection by an antiseptic solution. However, in the case of excrementitious matter, colored substances formed by bile coloring matter mainly consisting of stercobilin are included in the finally treated waste water. Therefore, the treated and discharged waste water is colored, thus resulting in water pollution.

SUMMARY OF THE INVENTION

With these problems in mind, therefore, it is the primary object of the present invention to provide a waste water treating method and an equipment by which the maintenance and management are simple; the dilution is not required; nitrogen can sufficiently be eliminated as well as organic substances; and the power consumption or energy can be economized.

It is the other object of the present invention to provide a waste water treating method and an equipment by which the treated waste water can be decolored so as not to without cause water pollution.

To achieve the above-mentioned object, the method according to the present invention comprises: (a) anaerobically treating waste water in dependence upon a plurality of groups of anaerobic bacteria for decomposition and denitrification of organic substances included in the waste water; (b) further decomposing the organic substances by passing the anaerobically treated waste water through at least one biological contact zone composed of the media for fixing bacteria and microorganism including a plurality of groups of methane bacteria for generation of methane gas on the basis of decomposition action of the methane bacteria groups; (c) repeatedly aerating the anaerobically treated waste water by mixing the treated waste water with hydrogen donor including organic substances and sludge for further reliable decomposition and denitrification of organic substances included in the anaerobically treated waste water; and (d) settling the sludge for separation of supernatant liquid to be discharged from the sediment of sludge.

Further, facultative anaerobic bacteria are cultured under anaerobic conditions on the basis of settled sludge, raw waste water and a culture liquid in a first seed bacteria culture tank, and the cultured sludge bacteria are used for anaerobically treating the waste water.

The methane bacteria are cultured on the basis of raw waste water and a culture liquid in a second seed bacteria culture tank, and the cultured methane bacteria are intermittently supplied to the biological contact zone for generation of methane gas.

The treated supernatant liquid is further ozone-treated for decolorization of the treated waste water. Part of ozone-treated waste water is returned and anaerobically treated again as circulating treated waste water.

The equipment for treating waste water according to the present invention comprises: (a) an anaerobic operation tank for anaerobically treating waste water in dependence upon a plurality of groups of anaerobic bacteria for decomposition of denitrification of organic substances included in the waste water and for further decomposing the organic substances by passing the anaerocially treated waste water through at least one biological contact zone composed of the media including a plurality of groups of methane bacteria for generating of methane gas on the basis of decomposition action of the methane bacteria groups; (b) an aerobic operation tank for repeatedly aerating the treated waste water by mixing the treated waste water with raw waste water including organic substances and sludge and for settling the sludge for separation of supernatant liquid to be discharged from the sediment of sludge; (c) a first seed bacteria culture tank for culturing facultative anaerobic bacteria on the basis of settled sludge, raw waste water, and a culture liquid to supply the cultured bacteria to the anaerobic operation tank; and (d) a second seed bacteria culture tank for culturing methane bacteria on the basis of raw waste water and a culture liquid to supply the cultured methane bacteria to the anaerobic operation tank. Further, the equipment includes an ozone treatment tank for treating the waste water flowed out of said aerobic operation tank by ozone to decolor the treated waste water.

BRIEF DESCRIPTION OF THE DRAWINGS

The features and advantages of the method of treating waste water and the equipment therefor according to the present invention will be more clearly appreciated from the following description of the preferred embodiment of the invention taken in conjunction with the accompanying drawings in which like reference numerals designates the same or similar elements or sections throughout the figures thereof and in which:

FIG. 5 is a treatment process diagram in the aerobic operation tank;

FIG. 6 is a longitudinal diagrammatical cross-sectional view showing an outflow mechanism of the aerobic operation tank;

DETAILED DESCRIPTION OF THE PREFERRED EMBODIMENTS

Figure 1:
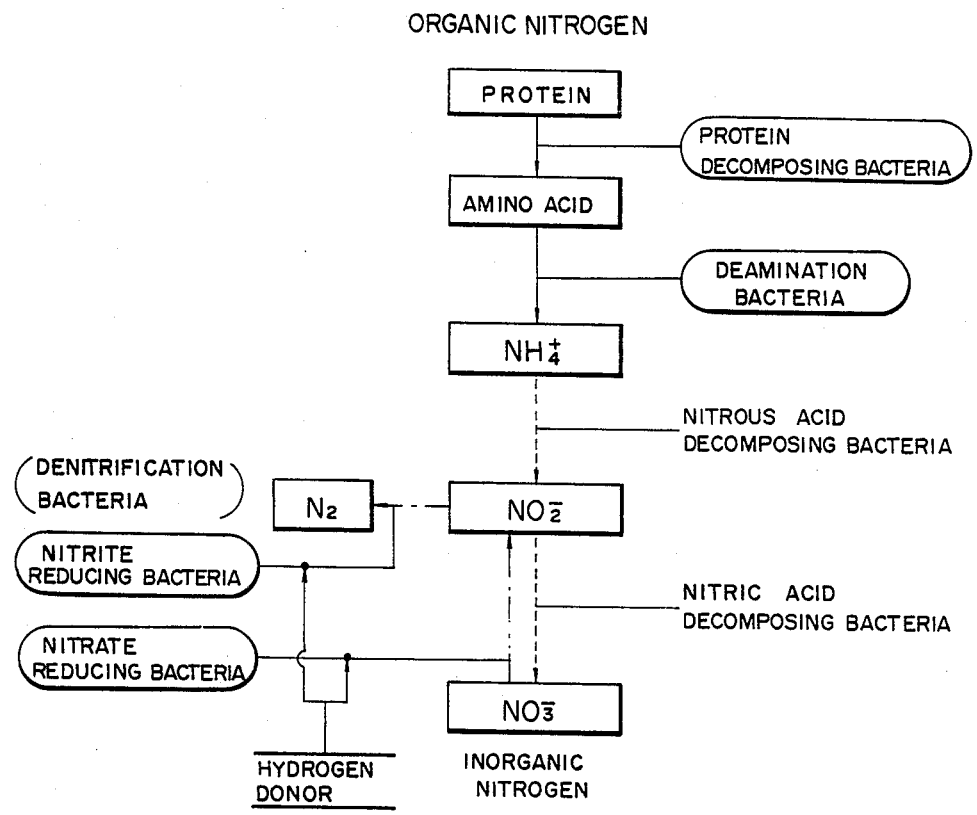
FIG. 1 is a model block diagram for assistance in explaining nitrification/denitrification reactions of various bacteria against organic nitrogen.

To facilitate understanding of the biological treatment, a brief reference will be made, by way of example, of the process that organic nitrogen compound such as protein is decomposed through nitrification reaction and denitrification reaction of various kinds of bacteria with reference to FIG. 1. In FIG. 1, the bacteria enclosed by frames are heterotrophy, and the bacteria other than those are autotrophy. Further, the reactions shown by dashed lines denote nitrification reaction occuring under aerobic conditions, while those shown by dot-dashed lines denote denitrification reaction occuring under anaerobic conditions.

Denitrification reactions can be expressed stoichiometrically as follows:

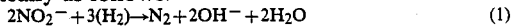
$$2NO_2^- + 3(H_2) \rightarrow N_2 + 2OH^- + 2H_2O \qquad (1)$$

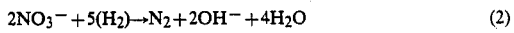
$$2NO_3^- + 5(H_2) \rightarrow N_2 + 2OH^- + 4H_2O \qquad (2)$$

where the formula (1) corresponds to nitrous acid respiration and the formula (2) corresponds to nitric acid respiration, respectively. The $(H_2)$ of these reactions is given by a hydrogen donor by way of the biological process in respiration enzyme within bacteria, and almost all denitrification bacteria react with organic substances as hydrogen donors.

With reference to the attached drawings, the method and equipment of the present invention will be described hereinbelow. The features of the present invention are (1) to provide an aerobic operation tank after an anaerobic operation tank; (2) to effect a two-stage aerobic treatment in the aerobic operation tank; (3) a plural groups of bacteria are cultured in two separate tanks before supplied to an anaerobic operation tank; (4) to provide a novel waste water outflow mechanism in combination of a floating body and a flexible pipe in the aerobic operation tank; and (5) to effect ozone treatment before discharging the treated waste water into a river.

Figure 2:
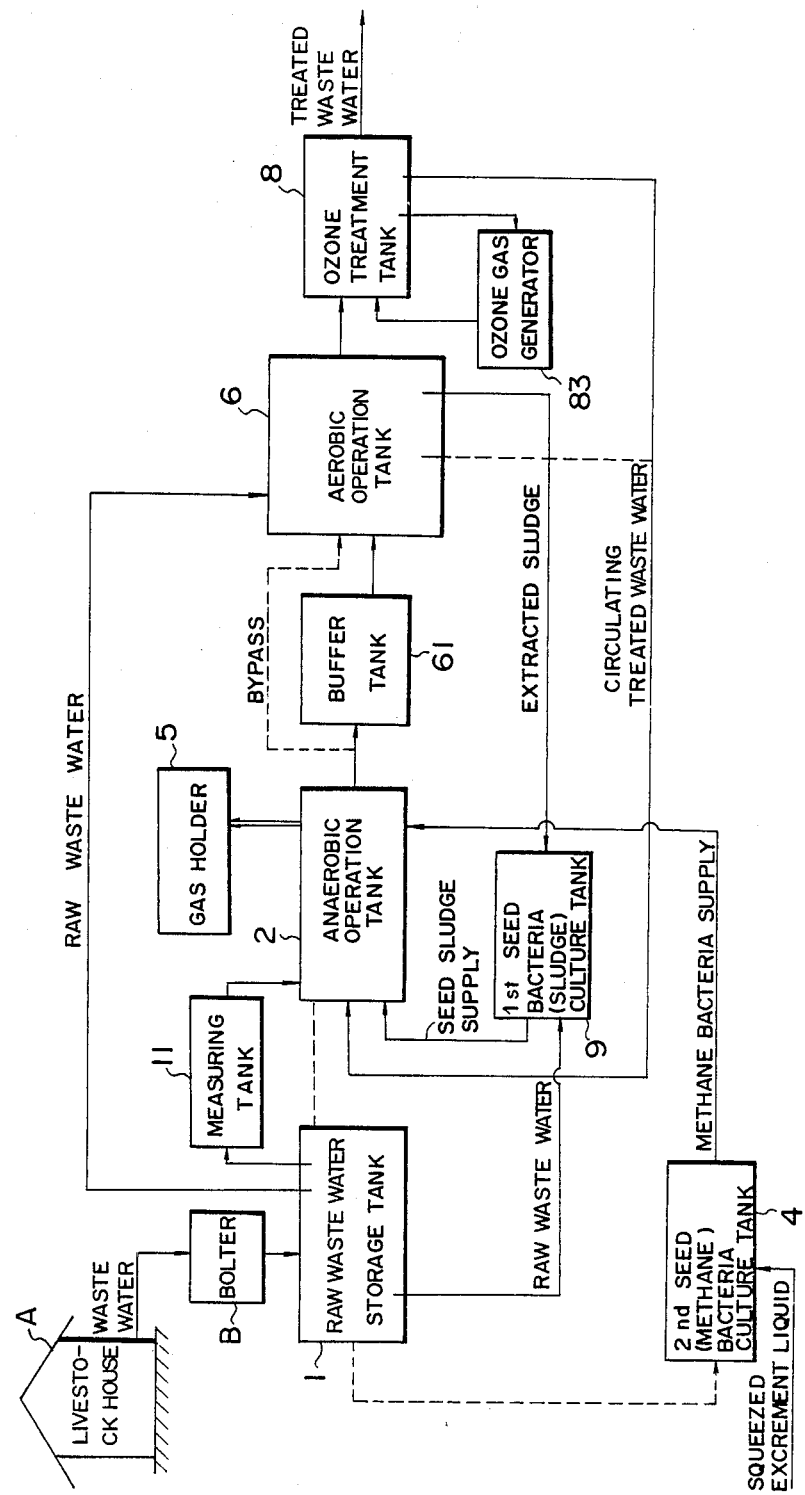
FIG. 2 is a diagrammatical process diagram showing the process and the equipment of an embodiment of the present invention.

FIG. 2 is a process diagram showing the method of this embodiment. On the basis of this drawing, the process of waste water treatment will be described in sequence. Further, the detail of each treatment process and the equipment used at each process will be described with reference to FIGS. 3 and after.

First, waste water discharged from a livestock house as for hogs A and including waste (excrements) and foul water is passed through a vibration bolter B to remove miscellaneous things such as feather and feed dregs, and then stored in a raw waste water (livestock sewage) storage tank 1. In the case where no fine miscellaneous things are not included in the waste water, it is possible to use a screen in place of the vibration bolter B.

The raw waste water is fed from the raw waste water storage tank 1 to an anaerobic operation tank 2 through a measuring tank 11 at a constant flow quantity or on the basis of overflow from the raw waste water storage tank 1 according to the amount of inflow quantity.

The anaerobic operation tank 2 effects denitrification reaction and methane fermentation in the sewage treatment process. The numeral 21 denotes an introduction chamber into which a high-concentration organic waste water such as livestock waste water is introduced. The upper portion of this chamber is exposed to the atmosphere. At the liquid surface portion of this introduction chamber 21, a plurality of introduction pipes 22 having a large number of 4 to 5 mm dia. holes are mounted in such a way as to extend in the vertical direction. Since plural introduction pipes are provided, the scum produced at the liquid surface portion sticks on the circumferences of the introduction pipes, and the waste water flows downstream through between the introduction pipes 22 or through the holes formed in the introduction pipes 22. Therefore, the flow from the liquid surface portion to the bottom portion in the introduction chamber 21 is smooth downstream. The reference numeral 23 denotes an anaerobic treatment chamber whose bottom portion communicates with the bottom portion of the introduction chamber 21 and whose upper portion is airtightly closed. At the middle portion of the anaerobic treatment chamber 23, a partition 24 forming a zigzag path is provided to pass the waste water in the upward direction and then in the downward direction. In this embodiment, this partition wall 24 forms a first chamber 23a and a second chamber 23b in symmetrical positional relationship thereto in the drawing. The reference numeral 25 denotes an outflow chamber whose bottom portion communicates with the bottom portion of the anaerobic treatment chamber 23 and whose upper portion is open to the atmosphere. In this outflow chamber 25, there is provided an overflow portion 26 for overflowing the waste water flowing in the upward direction from the bottom portion thereof, for instance, such as a V-notch shaped overflow portion 26 having a triangular upper edge for separating scum from the waste water.

Further, each portion of the anaerobic operation tank 2 is described in further detail. In the second chamber 23b of the anaerobic treatment chamber 23, a plural steps of biological contact zones 3a made of the media on which methane bacteria are attached and fixed are disposed at intervals in the upward direction. An aquifer 3b is formed between the two biological contact zones 3a. When the aquifer 3b is formed as described above, since buffer function is provided, it is possible to prevent the production of shorted stream flowing by shorting the biological contact zones 3a. As the media the biological contact zone 3a, it is preferable to use a material which can easily catch methane bacteria, for instance, such as a shell of surf clam, hog bone or porous ceramics. The above-mentioned biological contact zone 3a and the aquifer 3b are formed in the outflow chamber 25 in the same way. The biological contact zone 3a serves to heighten the contact efficiency between the methane bacteria and the waste water, and further serves to eliminate suspended solids in the waste water. In particular, these zones serve to prevent the generation of scum in the outflow chamber 25.

In the top wall of the anaerobic chamber 23, a gas outlet 27 is formed as a gas extracting portion to let gas generated within the anaerobic treatment chamber 23 out of the tank 2. The gas extracted therethrough is accommodated through a valve $V_1$ into a gas holder (not shown). Since the anaerobic treatment chamber 23 is airtightly closed and the introduction chamber 21 and the outflow chamber 25 are exposed to the atmosphere, the gaseous phase pressure in the anaerobic treatment chamber 23 is determined on the basis of a difference in liquid surface level between the anaerobic treatment chamber 23 and the introduction/outflow chambers 21 and 25. Further, since the liquid surface level of the latter can be adjusted according to the height of the overflow portion 26, the height exceeding the liquid surface level of the anaerobic treatment chamber 23 in the outflow chamber 25 functions as a pressure regulating section which can adjust the pressure of the gaseous phase portion. Since the pressure in the gaseous phase portion is adjusted by the pressure regulating section, it is possible to control the pressure in the gaseous portion within an appropriate pressure range so as not to suppress the reaction of methane fermentation, that is, so that the pressure in the gaseous portion is not excessively high. In addition, when the gas produced within the anaerobic treatment chamber 23 is used, the gas pressure can automatically be adjusted at a constant level. Therefore, it is possible to effectively utilize the gas without increasing the gas space or a dead space.

Further, on the outside of the overflow portion 26, there is disposed a scum storage portion 28 for storing scum flowing beyond the overflow portion. The scum stored therein is appropriately removed through a scum extracting valve $V_2$. This scum storage portion 28 is further provided because scum flows beyond the overflow portion 26 after scum has been removed by the biological contact zones 3a. The reference numeral 29 denotes a outflow portion for flowing out the treated waste water flowing beyond the scum storage portion 28. Further, the symbols $V_3$ and $V_4$ shown in the drawing denote sludge extracting valves.

Figure 3:
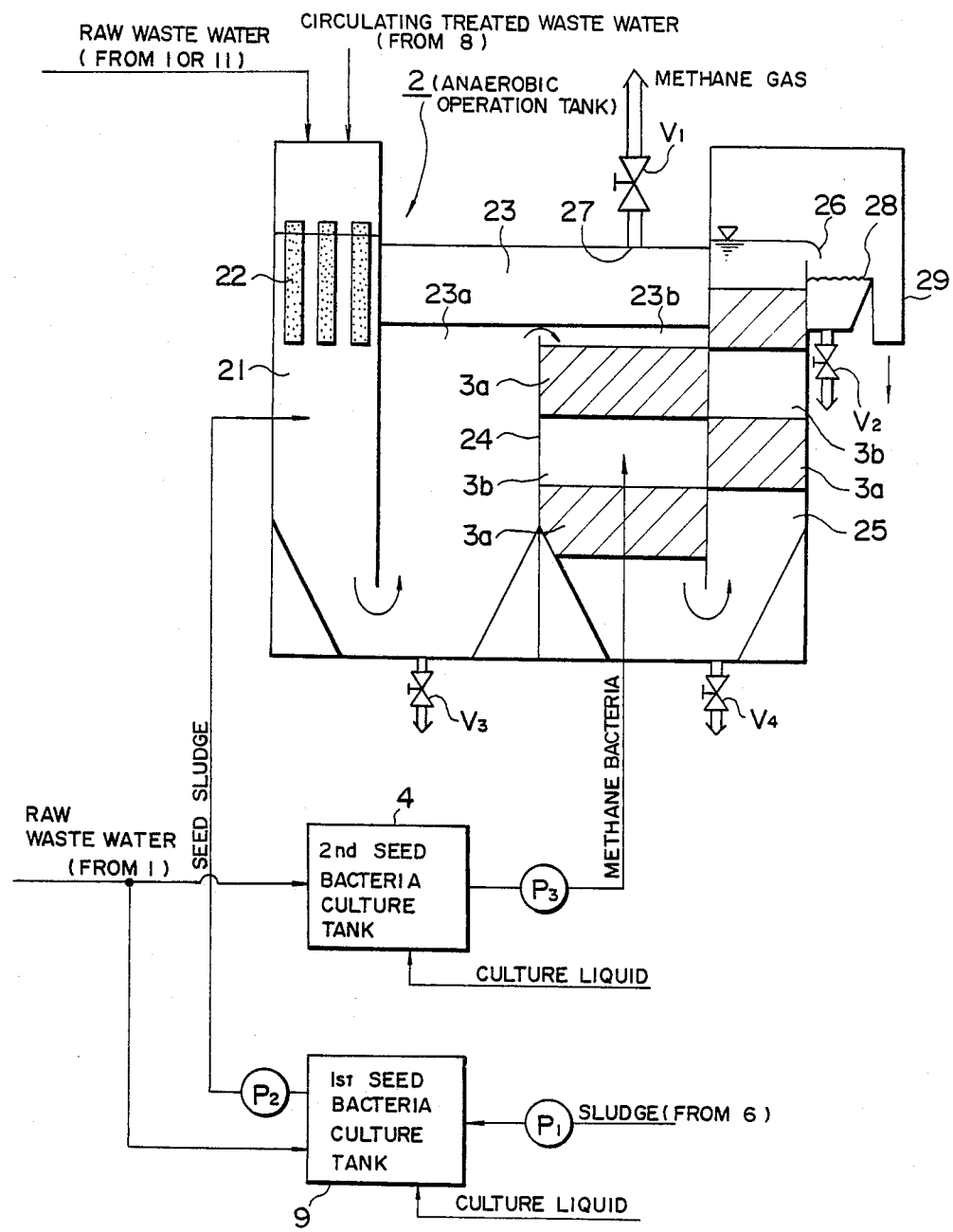
FIG. 3 is a longitudinal diagrammatical view showing an anaerobic operation tank, and the first and second seed bacteria culture tanks.

In FIG. 3, the reference numeral 9 denotes a first seed bacteria culture tank in which a group of facultative anaerobic bacteria including anaerobic organic substance decomposition bacteria, anaerobic acid forming bacteria and denitrification bacteria is cultured with a culture liquid peculiar to these bacteria and the waste water to be treated in the anaerobic operation tank 2 as substrate. As the facultative anaerobic bacteria, excessive sludge or its concentrated sludge produced in an aerobic operation tank 6 (described later) disposed after the anaerobic operation tank 2 are available. The sludge is fed to a first seed bacteria culture tank 9 by the pump $P_1$. In the drawing, the reference numeral 4 denotes a second seed bacteria culture tank in which the methane bacteria group is cultured with a culture liquid peculiar to the bacteria and the waste water to be treated as basic material.

The operation of the above equipment will be described hereinbelow.

A high-concentration organic waste water such as livestock house waste water, for instance is introduced from the upper portion of the introduction chamber 21, and then introduced through the introduction pipes 22, as a downstream flow, to the bottom portion of the introduction chamber 21. On the other hand, the facultative anaerobic bacteria group cultured in the first seed bacteria culture tank 9 is intermittently supplied by the pump $P_2$, and the waste water is mixed with this anaerobic bacteria group. Thereafter, the waste water flows in the upward direction from the bottom portion of the first chamber 23a of the anaerobic treatment chamber 23, overflows beyond the upper edge of the partition wall 24, passing through the biological contact zones 3a and the aquifers 3b alternately from the upper portion of the second chamber 23b, and flows from the bottom portion to the upper portion in the outflow chamber 25. To the biological contact zones 3a, the methane bacteria group cultured in the second seed bacteria culture tank 4 are intermittently supplied by the pump P3. Therefore, when the waste water flows in accordance with the path as described above, the organic substance changes into low molecule substances and further denitrification reaction occurs in dependence upon the action of the anaerobic bacteria group. Thereafter, the low molecule organic substances such as the organic acids, alcohols, etc. are decomposed to produce gas such as methane gas and carbon dioxide in dependence upon the action of methane bacteria group sticked onto the biological contact zones 3a. The gas produced as described above is collected in the gas holder (not shown) through the gas outlet port 27 so as to be effectively available as fuel. Further, when the waste water is passed through the biological contact zones 3a, the suspended solids are eliminated to purify the waste water. If the waste water reaches the overflow portion 26 of the outflow chamber 25 under the treatment thus explained, the waste water is separated into scum and treated waste water. The treated waste water falls into the scum storage portion 28 to remove scum still included in the treated waste water, and then flowed out through the outflow portion 29.

When the waste water anaerobic operation tank 2 as described above is adopted, since organic substances are decomposed and denitrified by the anaerobic bacteria group at the first stage and by the methane bacteria group at the second stage, the decomposition of organic substances is enhanced; waste water can well be treated; and it is possible to effectively utilize the produced and collected methane gas.

The waste water treated by the anaerobic operation tank 2 as described above is fed to a succeeding stage aerobic operation tank 6 through a bypass pipe continuously or after having accumulated once in a buffer tank (an adjustment tank) 61 intermittently. The former case (bypass) is referred to as continuous inflow type, while the latter case (adjustment tank) is referred to as batch inflow type.

Figure 4:
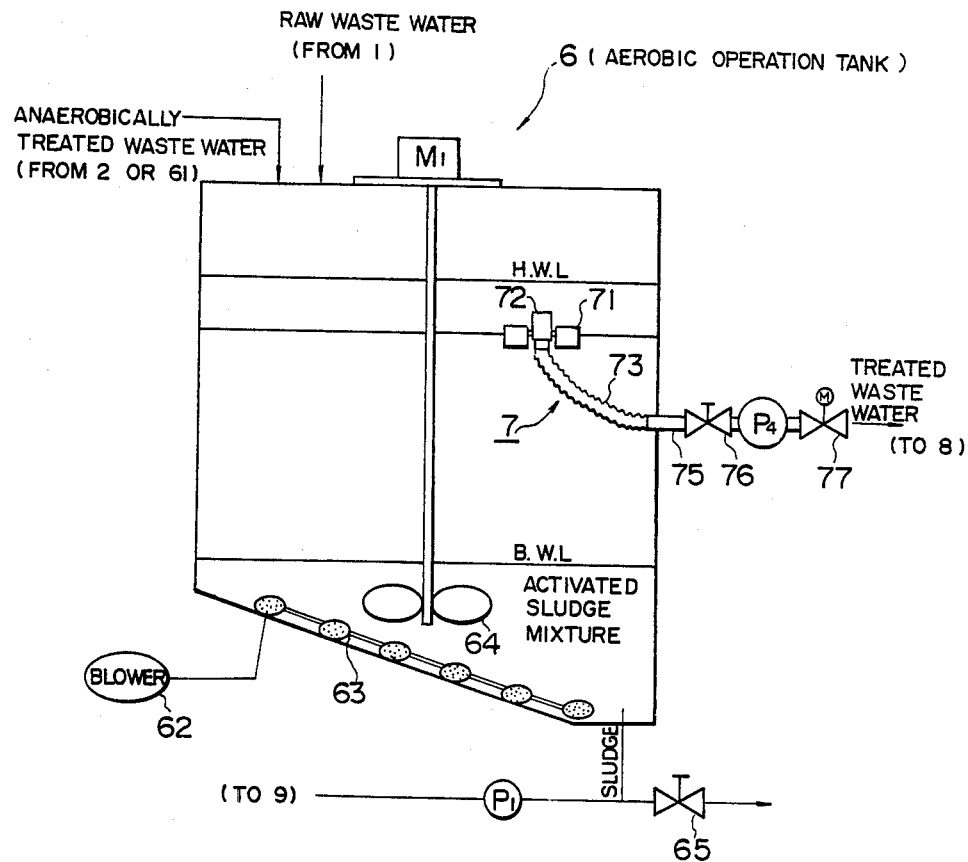
FIG. 4 is a longitudinal diagrammatical view showing an aerobic operation tank.

FIG. 4 shows the aerobic operation tank 6 and FIG. 5 shows the treatment process in the aerobic operation tank 6. The structure of the aerobic operation tank and the treatment process carried therein will be described with reference these drawings.

In FIG. 4, the reference numeral 62 denotes a blower; 63 denotes diffuser means; 64 denotes mixture agitator means; M1 denotes a motor. In this aerobic operation tank 6, a mixture liquid of activated sludge is previously accommodated to a base waste water level B.W.L. The waste water anaerobically treated in the anaerobic operation tank 2 is flowed in to a predetermined water level in the aerobic operation tank 6, agitated by the agitator means 64 to sufficiently mix the waste water and the activated sludge. Further, in this case, where the both are sufficiently mixed in the inflow process, the agitation process may be unnecessary. Thereafter, the blower 62 is driven to let off air by the diffuser means 63, by which the aerobic operation tank 6 is aerated for a predetermined hour. In the aeration process, the aerobic treatment is effected in dependence upon the aerobic bacteria group within the activated sludge, so that organic substance in the waste water is decomposed and nitrification reaction progresses. After a sufficient aeration, organic substances are sufficiently eliminated. After a sufficient nitrification, the aeration is stopped to settle the sludge. After the settled sludge has become under the anaerobic condition in this sedimentation process, an appropriate amount of a hydrogen donor such as raw waste water is intermittently flowed in from the raw waste water storage tank 1 into the aerobic operation tank 6. In the agitation process by the agitator means 64, the organic substances in the raw waste water are mixed with the sludge and the supernatant liquid. Here, the reason why the raw waste water is intermittently flowed in is to replenish organic substances as hydrogen donor as described later. The denitrification bacteria in the sludge take hydrogen from the organic substances via biological process of respiration enzyme in the agitation process, and the hydrogen is reacted with $NO_3^-$ and $NO_2^-$ included in the nitric acid and the nitrous acid formed in the aeration process to eliminate nitrogen by deoxidizing $NO_3^-$ and $NO_2^-$ into nitrogenous gas. Thereafter, aeration is effected again to eliminate the remaining organic substances in dependence upon the aerobic bacteria group and to nitrify ammonium component. Subsequently, the aeration is stopped to settle the sludge.

Further, in FIG. 4, the symbol P1 denotes a sludge extracting pump; 65 denotes a manual valve. The sediment of sludge precipitated in the aerobic operation tank 6 is extracted by the pump P1, and fed into the seed sludge culture tank 9 or flowed out of the system by the manual valve 65 as excessive sludge. In the sludge extraction process, the appropriate sludge extraction is to such an extent that the sludge retention time (SRT) is from 30 to 50 days. The supernatant liquid in the aerobic operation tank 6 is flowed out by a outflow mechanism 7 described later and then fed to the succeeding step ozone treatment tank 8.

As shown in FIGS. 4 and 6, the outflow mechanism 7 comprises two floating bodies 7 floated on the liquid surface in the aerobic operation tank 6, a cover portion 72 attached to these floating body 71 and serving as a cylindrical filter portion having an open bottom end, a flexible pipe 73 having one end formed with a waste water inlet portion and instead into the cover portion 72 with an outer diameter a little smaller than an inner diameter of the cover portion 72, a metal fixture 74 for fixing the flexible pipe 73 to the cover portion 72, an outflow pump P4 connected to the other end of the flexible pipe 73 via an outflow pipe 75 so as to suck the treated waste water through the water inlet port, and a manual valve 76 and a motor driven valve 77 disposed on both the sides of the outflow pump P4, respectively, as discharge valves. In the discharge mechanism 7 as described above, the flexible pipe 73 is always filled with the treated waste water other than the outflow process. Therefore, when the outflow pump P4 is driven in the outflow process, the supernatant water is sucked up through the opening end of the cover portion 72, passed through the water inlet port of the flexible pipe 73, and then flowed out toward the outside as the treated waste water. Where the outflow mechanism as shown is used, since the supernatant liquid can be sucked at the position below the liquid surface level, the scum flotation on the liquid surface level will not be sucked. Further, since the waste water is sucked up through a space formed between the cover portion 72 and the flexible pipe 73, solid substances such as sludge can be eliminated, thus resulting in an advantage such that the pipe will not be clogged. Further, the outflow speed of the supernatant waste water can be adjusted by the valves 76 and 77. In the drawing (FIG. 4), the symbol H.W.L. denotes the high limit waste water level.

Further, the quantity of raw waste water supply can be determined as follows: In the nitric acid respiration, since the amount of the theoretical oxygen demand (ThOD) corresponding to hydrogen donor $5(H_2)$ is stoichiometrically 5(O), the amount of 12.5% ThOD can be calculated as the amount of theoretically doped hydrogen. The assumption is made that $ThOd=BOD_5$, $BOD_5$ of 2.86 kg is necessary to denitrify $NO_3$ of 1 kg. Therefore, it is possible to determine this amount of supply on the basis of the raw waste water treating condition.

Figure 7A:
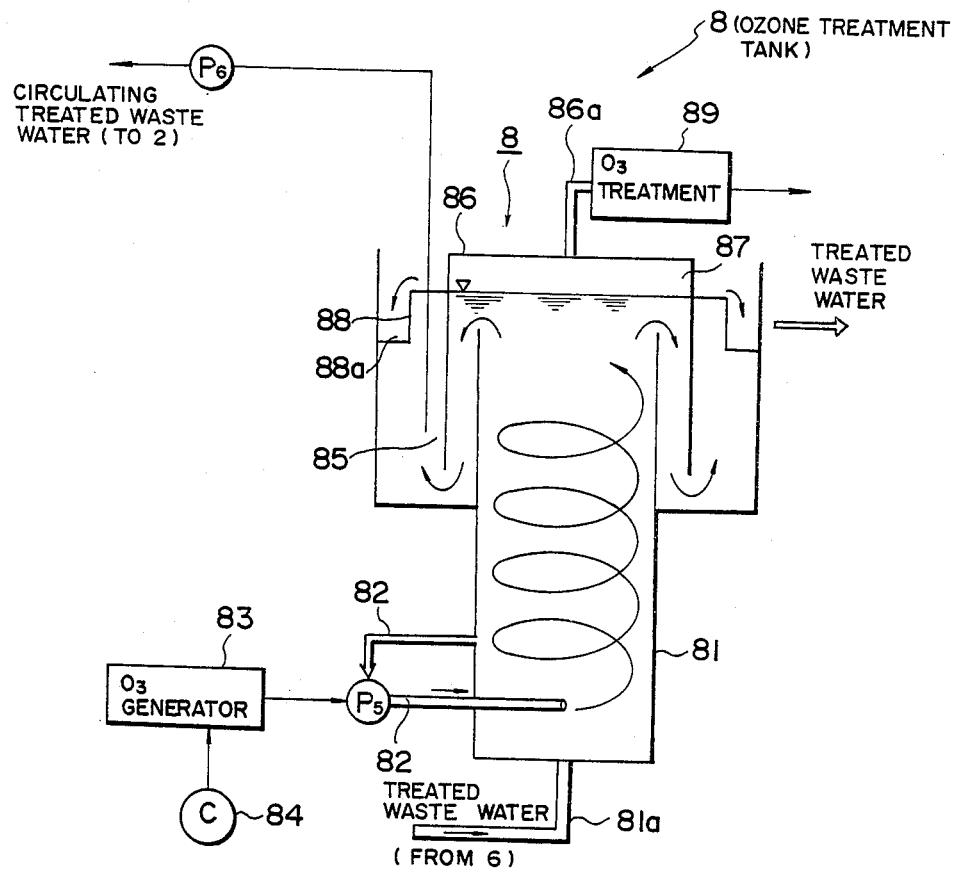
FIG. 7A is a longitudinal diagrammatical cross-sectional view showing an ozone treatment tank.

An ozone treatment tank 8 disposed after the anaerobic operation tank 6 will be described with reference to FIG. 7A. In FIG. 7A, the numeral 81 denotes a waste water tank. The waste water treated in the aerobic operation tank 6 is supplied through a waste water supply path 81a connected to the bottom portion of this waste water tank 81. The reference numeral 82 denotes a circulation waste water path, whose outlet is open to near the bottom portion of the waste water tank 81 and whose inlet is open to the waste water tank 81 at a position higher than that of the outlet. An ejector pump P5 is provided in this circulation waste water path 82. The numeral 83 denotes an ozone gas generator. Ozone gas is jetted into the ejector pump P5 when a compressor 84 is driven. Further, the outlet of the circulation waste water path 82 is so disposed that the treated waste water ejected from the outlet is flowed upward along the tangential line direction of a circle having a diameter a little smaller than the inner diameter of the waste water tank 81. The numeral 85 denotes an outflow communication path, which extends from above in the downward direction and then bends so as to go up with the outlet opened to the atmosphere. The numeral 86 denotes a top wall portion, and an air-tightly closed space 87 is formed between the wall portion 86 and the liquid surface. The numeral 88 denotes an overflow portion; 8a denotes a receiver portion. The treated waste water flowing through the communication path 85 flows into the receiver portion 88a beyond the overflow portion 88. The numeral 89 denotes an ozone gas treating section. The ozone gas filling the closed space 87 is introduced through the exhaust path 86a connected to the top wall portion 86 and treated in such a way as to be absorbed by an absorbent or deoxidization into oxygen by a reducing agent. The reason why the ozone gas is treated is that ozone gas exerts a harmful influence upon the human body when exhausted into the air as it is.

In the above ozone treatment tank 8, the waste water treated in the aerobic operation tank 6 is continuously supplied into the tank 81 from the bottom portion thereof through the outflow supply path 81a. The waste water flows up in the waste water tank 81, and part of the treated waste water circulates in the circulation waste water path 82. On the other hand, the ozone gas generated from the ozone gas generator 83 is jetted by the ejector pump P5, together with the waste water sucked through the circulation waste water path 82, from the outlet of the circulation waste water path 82 into the waste water tank 81 along the tangential line of a circle determined by the inner diameter of the waste water tank 81. By this, the ozone gas goes up in spiral fashion along the inner wall of the waste water tank 81 in contact with the inflow waste water. While the inflow waste water is in contact with the ozone gas, untreated organic substances are treated and in addition the colored substances are eliminated and further the inflow waste water is sterilized (disinfected). The ozone-treated waste water flows from the upper portion of the waste water tank 81 into the communication path 85, flowing once downward and then upward, and then drops in the receiver portion 88a after having overflowed beyond the overflow portion 88, before discharged in the river as treated waste water. Further, the ozone gas flowing upward in the waste water tank 81 fills the closed space 87, and enters into the ozone gas treating section 89 through the exhausted path 86a, thereafter being exhausted into the atmosphere after the absorption and/or deoxidization treatment. Part of the treated wasted water in the ozone treatment tank 8 is returned by the circulation pump P6 to the introduction chamber 21 of the anaerobic operation tank 2 as circulating treated waste water. When the treated waste water is circulated as described above, since part of the treated waste water is further anaerobically treated by the anaerobic operation tank 2, it is possible to further enhance the denitrification effect.

In the present invention, even where no ozone treatment tank 8 is provided for ozone treatment, it is possible to obtain a high denitrification effect in the same way by returning part of the treated waste water from the aerobic operation tank 6 to the introduction chamber 21 as circulating treated waste water.

Figure 7B:
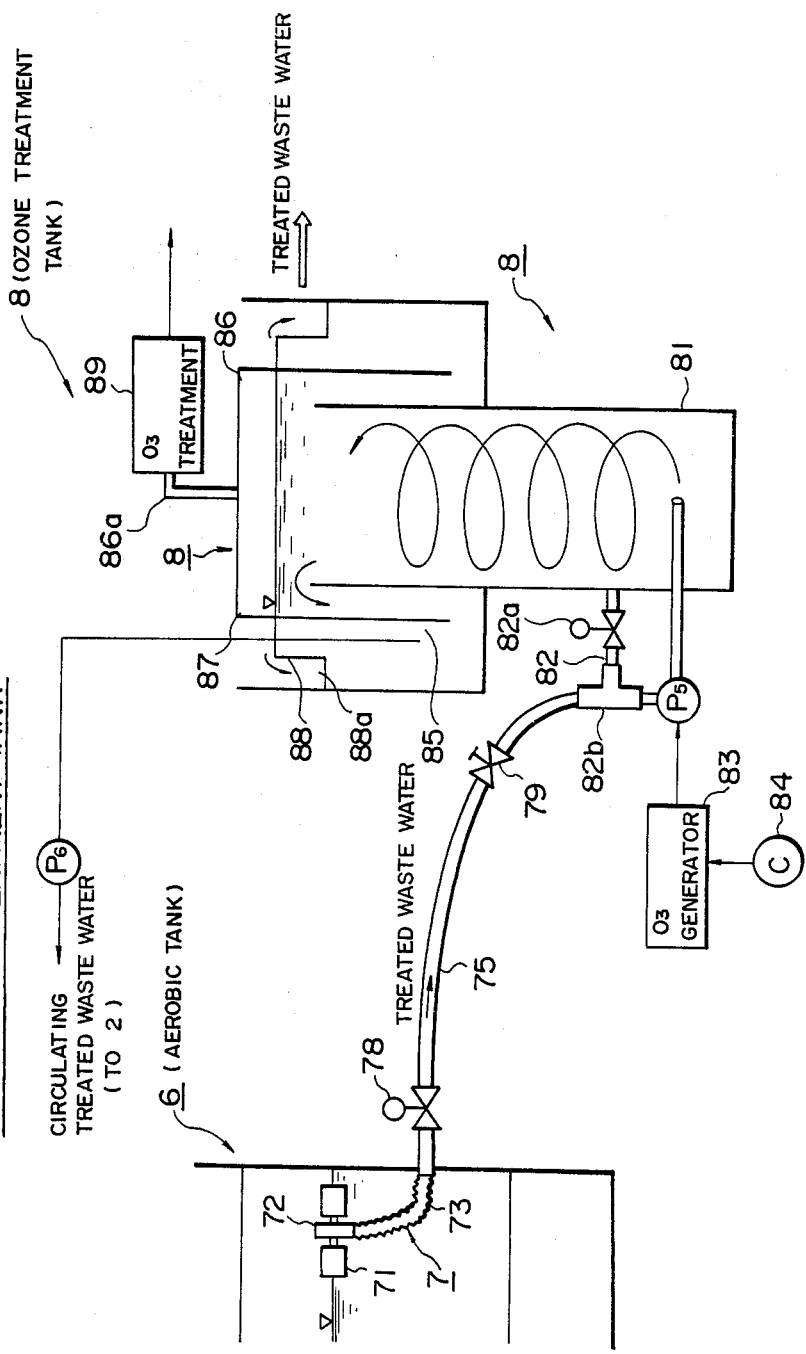
FIG. 7B is a longitudinal diagrammatical cross-section views showing an example of combinations between the aerobic operation tank and the ozone treatment tank.

In order to supply the waste water from the aerobic operation tank 6 to the ozone treatment tank 8, it may be possible to connect the outflow mechanism 7 of the aerobic operation tank 6 and the ejector pump P5 of the ozone treatment tank 8 as shown in FIG. 7B. That is to say, in the case of the embodiment shown in FIG. 7B, a motor driven valve 78 and an additional manual valve 79 are provided for the outflow pipe 75 of the outflow mechanism 7, and the outflow pipe 75 is connected to the circulation path 82 through a T-shaped connection pipe 82b. The numeral 82a denotes a motor-driven valve. In such a construction as described above, since the waste water from the aerobic operation tank 6 is directly ozone-treated in the ejector pump P5, it is possible to further enhance the ozone treatment effect and to further reduced the degree of color in the treated waste water.

Here, the supply of anaerobic bacteria group used in the anaerobic operation tank 2 will be described. In FIG. 2, the sludge extracted from the aerobic operation tank 6 and the raw waste water from the raw waste water tank 1 are fed into the seed sludge culture tank 9 to culture the sludge with the raw waste water as a culture fluid under anaerobic condition. The cultured facultative anaerobic bacteria (including denitrification bacteria) are intermittently supplied to the anaerobic operation tank 2.

Figure 8:
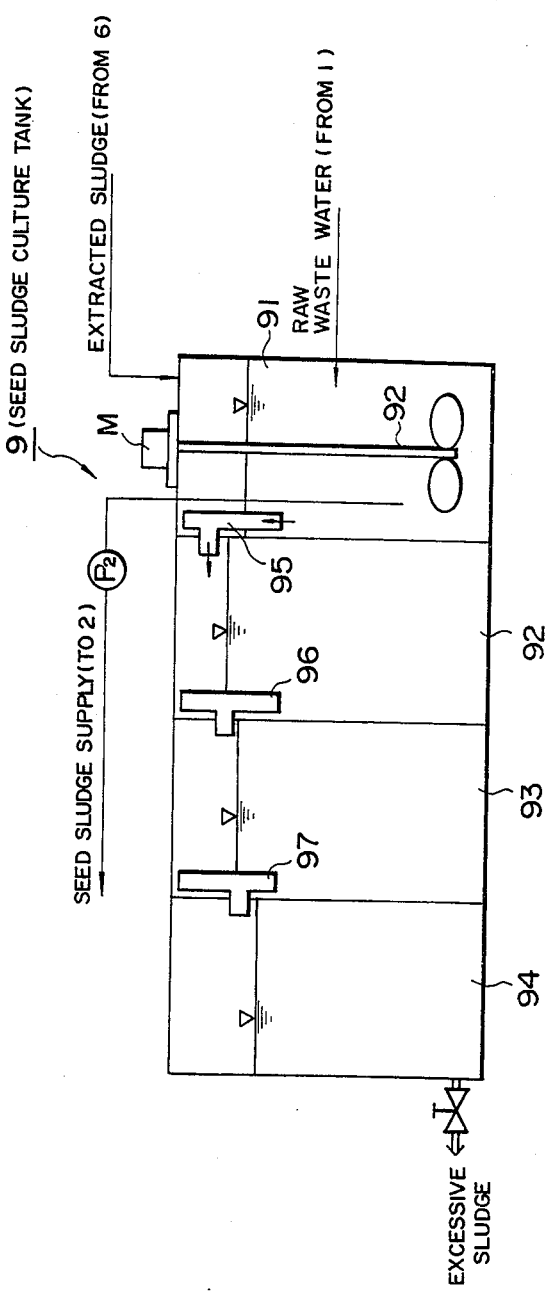
FIG. 8 is a longitudinal diagrammatical cross-sectional view showing a seed sludge culture tank.

FIG. 8 shows an example of the seed sludge culture tank 9. A waste water agitator means 92 is provided in the culture chamber 91. The sludge cultured by this culture chamber 91 is supplied to the anaerobic operation tank 2 by the pump P2 together with the culture fluid. Further, in the case where the supply amount of the sludge is large, it is preferable to design a multiple tank structure, that is, to further provide culture chambers 92 to 94 as shown in FIG. 8 in order to obtain both the effects of buffer tanks and concentration tanks, without simply increasing the volume of the culture chamber.

In FIG. 8, the numerals 95 to 97 denote communication path members, whose upper portion is open so as to facilitate the flow of the culture fluid and sludge. In the case of the multiple tank structure as described above, a pump (not shown) is provided for each culture chamber to supply the seed sludge into the anaerobic operation tank 2. According to the method of supplying the seed sludge to the anaerobic operation tank 2 by providing the seed sludge culture tank 9 as described above, a high denitrification effect is obtained, and further the sludge extracated from the aerobic operation tank 6 can effectively utilized.

In the above description, the larger the volume of the anaerobic operation tank 2 is, the higher the treatment effect will be. However, if the tank 2 is large in volume, since the anaerobic tank is inevitably increased in size, it is appropriate to set the hydraulic retention time to about 5 days.

Further, with respect to each process control of the aerobic operation tank 6, although it is possible to implement a previously time-determined sequence control, it is also possible to adopt such a control as to determine each process timing on the basis of the waste water quality standard such as oxidization reduction potential or pH. The latter method can expect an effective treatment.

Further, in the embodiment, when bacteria which can decompose decomposition-resistant substances such as PCB, ABS, etc. are screened and then used as seed bacteria or seed sludge, it is possible to biologically treat PCB or ABS.

As described above, in the present invention, waste water is first anaerobically treated by anaerobic bacteria group and methane bacteria group in the anaerobic operation tank; aerobically treated in the aerobic operation tank; anaerobically treated by supplying organic substance serving as hydrogen donor into the waste water under anaerobic conditions; and then aerobically treated again. Therefore, it is possible to treat a high concentration organic waste water without dilution, to sufficiently decompose the organic substances, to obtain high denitrification effect, and thus to perform a good waste water treatment. In addition, since the control of the amount of dissolved oxygen is unnecessary as in the activated sludge method, the maintenance and management are simple. Further, the method of the present invention is of energy-saving type because continuous aeration is unnecessary. Further, since the treatment due to methane bacteria is utilized in the anaerobic tank, it is possible to expect a methane collecting effect. If this methane collecting effect is not expected, it is possible to treat organic waste water of low concentration. Further when the water treated by the aerobic tank is further treated by ozone gas in the ozone treatment tank, it is possible to disinfect the treated waste water and to eliminate colored substances, thus preventing the occurrence of water pollution.

As described above, according to the present invention, since two-stage batch method is adopted such that waste water is first aerobically treated and then anaerobically treated by supplying organic substances in the waste water as hydrogen donor under anaerobic conditions, and again aerobically treated, it is possible to sufficiently eliminate nitrogen included in nitric acid and nitrous acid formed by the aerobic treatment, and the remaining organic substances after anaerobic treatment can be decomposed by the next-stage aerobic treatment. Therefore, it is possible to effect good sewage treatment. Therefore, since is is possible to use raw waste water as hydrogen donor in the anaerobic treatment, the running cost can be reduced. Further, in the equipment according to the present invention, it is possible to suitably realize the method of present invention by the above-mentioned equipment. Further, the outflow mechanism in which the floating bodies and the flexible pipe are combined with each other is used, it is possible to always suck the water from near the liquid surface level in spite of a simple mechanism. Therefore, since only the supernatant can be flowed out and the sucking pressure is constant irrespective of the liquid surface level, it is possible to smoothly outflow the treated waste water from the aerobic operation tank without clogging of the filter section.

Further, according to the present invention, since microorganism groups are cultured separately as seed bacteria group in correspondence to the object of the sewage treatment tanks, and supplied to the sewage treatment tanks, it is possible to enhance the sewage treatment function and to obtain a stable microorganism metabolic action.

What is claimed is:

1. An equipment for treating waste water comprising:
   (a) a source of waste water including organic substances;
   (b) an anaerobic tank having a flow path having an inlet connected to the waste water source for having a supply of the waste water from the waste water source, the flow path having an outlet;
   (c) means for supplying anaerobic bacteria into the flow path at a first position for anaerobically treating the waste water;
   (d) at least one biological contact zone provided in the flow path at a second position downstream of the first position;
   (e) a bacteria culture tank for culturing methane bacteria;
   (f) means for supplying the cultured methane bacteria from the bacteria culture tank to the at least one biological contact zone to further anaerobically treat the waste water passing the at least one biological contact zone;
   (g) an aerobic tank connected to the outlet of the flow path of the anaerobic tank for having a supply of the waste water from the anaerobic tank, the aerobic tank containing activated sludge including aerobic bacteria for aerobically treating the waste water discharged from the anaerobic tank; and
   (h) means for discharging the treated waste water from the aerobic tank.

2. The equipment as claimed in claim 1, wherein the bacteria culture tank contains a culture liquid peculiar to the methane bacteria and the bacteria culture tank has means for receiving a supply of the waste water from the waste water source.

3. The equipment as claimed in claim 2, wherein the cultured methane bacteria supplying means includes means for supplying the cultured methane bacteria intermittently to the at least one biological contact zone.

4. The equipment as claimed in claim 1, which includes a bacteria culture tank for culturing the anaerobic bacteria to be supplied into the flow path at the first position.

5. The equipment as claimed in claim 1, which includes means for recirculating the treated waste water from the aerobic tank into the anaerobic tank.

6. The equipment as claimed in claim 1, which includes means provided in the aerobic tank for agitating the waste water with the activated sludge at predetermined time intervals and means for introducing air into the aerobic tank at predetermined time intervals.

7. The equipment as claimed in claim 1, which includes means for introducing waste water from the waste water source into the aerobic tank.

8. The equipment as claimed in claim 1, wherein the treated waste water discharging means includes a floating body floating on the waste water in the aerobic tank, a flexible pipe secured to the floating body to have an inlet positioned below the level of the waste water in the aerobic tank, and a filter attached to the flexible pipe for preventing contaminants from reaching the flexible pipe.

9. The equipment as claimed in claim 1, which includes an ozonizing tank connected through the treated waste water discharging means to the aerobic tank, means for supplying the treated waste water through the treated waste water discharging means into the ozonizing tank, and means for introducing ozone gas into the ozonizing tank to ozonize the treated waste water.

10. The equipment as claimed in claim 9, which includes means for returning a part of the waste water from the ozonizing tank into the anaerobic tank.

11. The equipment as claimed in claim 9, wherein the ozone gas introducing means includes a source of ozone gas for supplying ozone gas under a pressure, a circulation conduit having an inlet opening into the ozonizing tank and an outlet opening into the ozonizing tank, and an ejector pump provided in the circulation conduit, the ejector pump having an inlet connected to the ozone gas source for injecting the ozone gas under a high pressure to circulate the waste water through the circulation conduit.

12. The equipment as claimed in claim 11, wherein the treated waste water discharging means is connected to the circulation conduit at a position upstream of the ejector pump.

13. The equipment as claimed in claim 11, wherein the treated waste water discharging means includes a floating body floating on the waste water in the aerobic tank, a flexible pipe secured to the floating body to have an inlet positioned below the level of the waste water in the aerobic tank, and a filter attached to the flexible pipe for preventing contaminants from reaching the flexible pipe.

14. The equipment as claimed in claim 13, wherein the flexible pipe is connected to the circulation conduit at a position upstream of the ejector pump.

* * * * *